(12) United States Patent
Levanen et al.

(10) Patent No.: US 12,456,997 B2
(45) Date of Patent: Oct. 28, 2025

(54) EQUALIZATION IN A WIRELESS COMMUNICATION SYSTEM

(71) Applicant: Nokia Solutions and Networks Oy, Espoo (FI)

(72) Inventors: Toni Aleksi Levanen, Tampere (FI); Hesham Elgendi, Tampere (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/058,149

(22) Filed: Feb. 20, 2025

(65) Prior Publication Data

US 2025/0279797 A1    Sep. 4, 2025

(30) Foreign Application Priority Data

Feb. 29, 2024 (FI) .................................... 20245249

(51) Int. Cl.
*H04B 7/0452* (2017.01)
*H04B 1/10* (2006.01)
*H04L 25/03* (2006.01)

(52) U.S. Cl.
CPC ......... *H04B 1/10* (2013.01); *H04L 25/03019* (2013.01); *H04L 25/03159* (2013.01)

(58) Field of Classification Search
CPC ... H04W 24/02; H04W 72/541; H04W 72/23; H04W 88/085; H04W 24/10; H04W 24/08; H04W 52/243; H04W 72/542; H04B 7/0617; H04B 7/0854; H04B 7/0452; H04B 7/0417; H04B 7/0413; H04B 7/0632; H04B 7/0639; H04B 7/0456; H04L 25/021; H04L 5/0048; H04L 5/0073; H04L 25/0204;
(Continued)

(56) References Cited

U.S. PATENT DOCUMENTS 6,912,250 B1 *  6/2005  Adireddy ......... H04L 25/03057
                                                                  375/348
7,031,383 B2 *  4/2006  Shanbhag ......... H04L 25/03878
                                                                  375/232

(Continued)

FOREIGN PATENT DOCUMENTS

CN           116055278 A      5/2023

OTHER PUBLICATIONS

Goldsmith, "Wireless Communications", Cambridge University Press, 2005, 571 pages.

(Continued)

*Primary Examiner* — Eva Y Puente
(74) *Attorney, Agent, or Firm* — Nokia Technologies Oy

(57) ABSTRACT

The present subject matter relates to a method comprising: receiving a radio frequency signal, the radio frequency signal comprising components, wherein each component is associated with a time unit and a frequency unit; selecting components of the radio frequency signal, the selected components comprising reference data; computing, for the selected components, equalization coefficients, referred to as initial equalization coefficients; deriving the equalization coefficients for non-reference data components of the radio frequency signal by interpolating, along at least one of time domain or frequency domain, the initial equalization coefficients.

18 Claims, 5 Drawing Sheets

(58) Field of Classification Search
CPC ... H04L 5/0051; H04L 25/0224; H04L 5/005; H04L 5/0023
See application file for complete search history.

(56) References Cited

U.S. PATENT DOCUMENTS

| | | | | |
|---|---|---|---|---|
| 7,251,273 | B2* | 7/2007 | Hwang | H04L 25/03159 375/229 |
| 8,699,448 | B2 | 4/2014 | Lindqvist et al. | |
| 11,855,811 | B1* | 12/2023 | Levanen | H04L 25/03891 |
| 2005/0169361 | A1* | 8/2005 | Yousef | H04L 25/03057 375/233 |
| 2005/0259728 | A1* | 11/2005 | Nieto | H04L 25/03057 375/233 |
| 2006/0146690 | A1* | 7/2006 | Zhang | H04L 25/022 370/203 |
| 2008/0235311 | A1 | 9/2008 | Budianu et al. | |
| 2012/0183103 | A1 | 7/2012 | Gong | |
| 2012/0308022 | A1* | 12/2012 | Ookuri | G10K 11/1783 381/71.1 |
| 2019/0379562 | A1 | 12/2019 | Rane | |
| 2021/0076409 | A1 | 3/2021 | Goto et al. | |
| 2024/0187049 | A1* | 6/2024 | Koteshwar Srinath | H04L 25/03165 |
| 2024/0364573 | A1* | 10/2024 | Schiller | H04L 27/3863 |

OTHER PUBLICATIONS

Chiueh et al., "OFDM Baseband Receiver Design for Wireless Communications", John Wiley and Sons, 2007, 240 pages.

Huusko, "Tursas results from linear FD interpolation and disturbance covariance matrix averaging", Nokia, 2022, 46 pages.

"Computational complexity of matrix multiplication", Wikipedia, Retrieved on Feb. 18, 2025, Webpage available at : https://en.wikipedia.org/wiki Computational_complexity_of_matrix_multiplication#Matrix_inversion,_determinant_and_Gaussian_elimination.

"On DMRS enhancement in Rel-18", 3GPP TSG-RAN WG1 Meeting #110bis-e, R1-2210078, Agenda: 9.1.3.1, Ericsson, Oct. 10-19, 2022, pp. 1-31.

Sridhar et al., "Interference Cancellation and Channel Estimation for MIMO-LTE-A Networks", International Conference on Wireless Communications, Signal Processing and Networking (WiSPNET), Mar. 23-25, 2016, pp. 2098-2103.

Ohwatari et al., "Performance of Advanced Receiver Employing Interference Rejection Combining to Suppress Inter-cell Interference in LTE-Advanced Downlink", IEEE Vehicular Technology Conference (VTC Fall), Sep. 5-8, 2011, 7 pages.

Wu et al., "Ue MMSE-IRC Receiver for Suppressing Inter-cell and Inter-user Interference in 5G NR Standardization", IEEE 8th International Conference on Computer and Communications (ICCC), Dec. 9-12, 2022, pp. 258-262.

Office Action received for corresponding Finnish Patent Application No. 20245249, dated Aug. 15, 2024, 9 pages.

Kumar et al., "Low complexity interference rejection combining equalizer for extreme massive MIMO", IEEE Wireless Communications and Networking Conference (WCNC), Apr. 21-24, 2024, 6 pages.

Office Action received for corresponding Finnish Patent Application No. 20245249, dated Jan. 24, 2025, 5 pages.

Extended European Search Report received for corresponding European Patent Application No. 25156298.9, dated Jul. 2, 2025, 11 pages.

* cited by examiner

EQUALIZATION IN A WIRELESS COMMUNICATION SYSTEM

RELATED APPLICATION

This application claims benefit of priority from Finnish Patent App. No. 20245249, filed on Feb. 29, 2024, the disclosure of which is hereby incorporated in its entirety by reference herein.

TECHNICAL FIELD

Various example embodiments relate to telecommunication systems, and more particularly to equalization in a wireless communication system.

BACKGROUND

As data rates and capacity requirements increase with the evolution of wireless communication standards and considering current trends focusing on sustainability and power consumption reductions expected from information and communications technology (ICT) sector, the power consumption may become main issue. Therefore, more efficient solutions in terms of computational complexity, memory use, and data transfers are needed.

SUMMARY

Example embodiments provide an apparatus for a wireless communication system, the apparatus comprising means, the means being configured for: receiving a radio frequency signal, the radio frequency signal comprising components, wherein each component of the components is associated with a time unit and a frequency unit; selecting components of the radio frequency signal, the selected components comprising reference data; computing, for the selected components, equalization coefficients, referred to as initial equalization coefficients; deriving the equalization coefficients for non-reference data components of the radio frequency signal by interpolating the initial equalization coefficients along at least one of time domain or frequency domain.

Example embodiments provide a method comprising: receiving a radio frequency signal, the radio frequency signal comprising components, wherein each component is associated with a time unit and a frequency unit; selecting components of the radio frequency signal, the selected components comprising reference data; computing, for the selected components, equalization coefficients, referred to as initial equalization coefficients; deriving the equalization coefficients for non-reference data components of the radio frequency signal by interpolating, along at least one of time domain or frequency domain, the initial equalization coefficients.

Example embodiments provide a computer program comprising instructions, which when executed by an apparatus, cause the apparatus to perform at least the following: receiving a radio frequency signal, the radio frequency signal comprising components, wherein each component is associated with a time unit and a frequency unit; selecting components of the radio frequency signal, the selected components comprising reference data; computing, for the selected components, equalization coefficients, referred to as initial equalization coefficients; deriving the equalization coefficients for non-reference data components of the radio frequency signal by interpolating, along at least one of time domain or frequency domain, the initial equalization coefficients.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
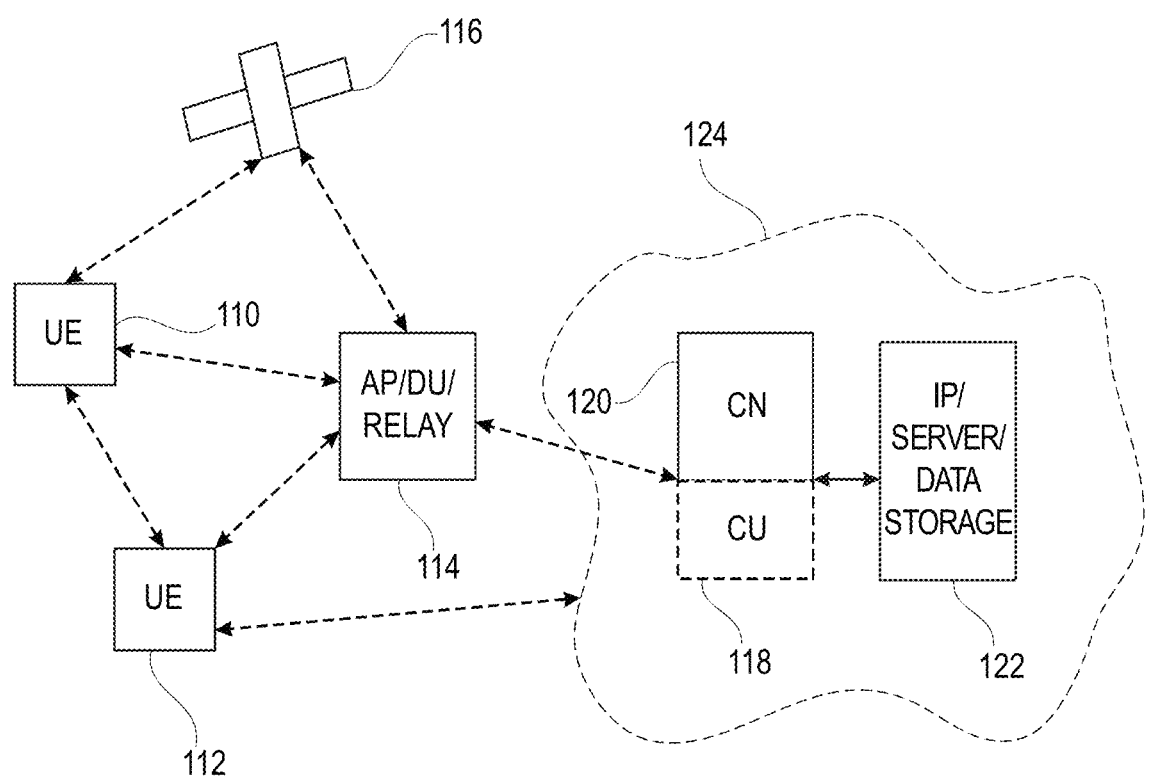
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

A wireless communication system may be provided. The wireless communication system comprises nodes such as base stations, wherein each node may serve user equipments (UEs) located within the node's geographical area of service. The wireless communication system may support one or more radio access technologies (RATs). A radio access technology of the radio access technologies may, for example, be evolved universal terrestrial radio access (E-UTRA), 5G new radio (NR), or a future 6G based system, but it is not limited to, as a person skilled in the art may apply the present subject matter to other wireless communication systems provided with necessary properties.

Radio frequency (RF) signals, in the wireless communication system, may be subject to various degrading factors such as signal interference, multipath fading, and other environmental conditions. This interference may degrade the quality of the received signal and make it difficult to extract the desired information. To address this issue, equalization techniques may be employed. The equalization technique may aim to adjust the received signal to compensate for any distortions or errors introduced during transmission. The equalization technique involves the computation of equalization coefficients. However, the computation of the equalization coefficients may be a complex and computationally intensive process.

The present subject matter may solve this issue. The present subject matter may reduce complexity of the equalization process without impacting link performance compared to a baseline equalizer. It may provide a simplified equalization process, allowing for significant reduction in computation complexity. For that an apparatus is provided.

The apparatus may, for example, be a receiver or part of a receiver in the wireless communication system.

The apparatus may comprise means. These means are configured for receiving a radio frequency signal. The radio frequency signal may comprise components, with each component being associated with a specific time unit and frequency unit. The radio frequency signal may be received through one or more receiving antennas. The means may, for example, comprise at least one processor, and at least one memory including computer program code. For example, the at least one memory and computer program code may be configured to, with the at least one processor, to perform the method.

The means of the apparatus are also configured for selecting components of the radio frequency signal. The selected components comprise reference data. The selected components may, for example, be a subset of all components of the radio frequency signal that comprise reference data. This may be advantageous as this may further reduce the complexity of the computations. Alternatively, the selected components may, for example, be all components of the radio frequency signal that comprise reference data. This may enable to reduce the complexity of the computations while providing more accurate equalization coefficients. The selected components may also be referred to as reference data components. The selected component may, for example, comprise one or more pilot symbols. For example, where the radio frequency signal comprises multiple components associated with different time units and frequency units, the means of the apparatus may first select the components that contain reference data, which are known and may be used as a basis for interference rejection. The non-reference component does not comprise pilot symbols. The non-reference component may comprise one or more data symbols e.g., representing user data.

In addition, the means of the apparatus are configured for computing, for the selected components, equalization coefficients. These equalization coefficients are referred to as initial equalization coefficients. For example, once the reference data components are selected, the means compute the initial equalization coefficients for these components. These initial equalization coefficients may represent the initial estimation of the interference present in the selected components.

Furthermore, the means of the apparatus are configured for deriving the equalization coefficients for non-reference data components of the radio frequency signal. This is achieved by performing interpolation along the time domain and/or the frequency domain using the initial equalization coefficients as a starting point. The interpolation process may allow for the estimation of the interference present in the non-reference data components based on the known interference in the reference data components. Interpolation may be a process that allows for the estimation of values between known data points. The interpolation may be performed using a technique such as linear interpolation, spline interpolation, or any other suitable interpolation method.

In the time domain, the means may interpolate the initial equalization coefficients between the time units of the reference data components to obtain the equalization coefficients for the non-reference data components at the corresponding time units. The interpolation along the time domain may, for example, be a linear interpolation.

Similarly, in the frequency domain, the means may interpolate the initial equalization coefficients between the frequency units of the reference data components to obtain the equalization coefficients for the non-reference data components at the corresponding frequency units. Again, various interpolation methods can be employed, depending on the specific requirements and characteristics of the radio frequency signal. The interpolation along the frequency domain may, for example, be a linear interpolation.

By performing interpolation along the time domain and/or the frequency domain, the means of the apparatus may be able to flexibly derive accurate equalization coefficients for the non-reference data components of the radio frequency signal.

These final equalization coefficients may then be used for interference rejection and signal processing purposes.

In one example, the present subject matter may enable adaptable interpolation e.g., based on the specific characteristics of the radio frequency signal and the desired performance of the apparatus. For example, different interpolation methods can be used for different frequency ranges or time intervals to optimize the accuracy and efficiency of the equalization coefficients derivation. For example, the interpolation method used for interpolation along the time domain may be different from the interpolation method used for interpolation along the frequency domain. In another example, different interpolation methods may be used respectively for interpolation along the time domain covered by different groups of time units. In another example, different interpolation methods may be used respectively for interpolation along the frequency domain covered by different groups of frequency units.

In addition, alternative methods for deriving the equalization coefficients for non-reference data components can also be employed. For instance, an interpolation may be performed by regression analysis techniques which may estimate the equalization coefficients based on the known interference in the selected reference data components. Machine learning algorithms, such as neural networks, may also be employed to learn the relationship between the reference data components and the non-reference data components, and derive the equalization coefficients accordingly.

The apparatus may comprise one or more receiving antennas. In one example, apparatus may comprise one receiving antenna. In this case, the equalization coefficient(s) derived for each component may be a scalar or a vector depending on the number of layers that provide the radio frequency signal. The number of layers refers to the number of independent data streams transmitted simultaneously to the apparatus. The number of layers may, for example, be smaller than or equal to the number of transmitting antennas used to transmit the streams. The number of layers may, for example, be smaller than or equal to the number of receiving antennas in the apparatus.

Alternatively, the apparatus may comprise multiple receiving antennas. In this case, each component of the radio frequency signal may be a vector of data symbols, wherein each data symbol is received through a respective antenna of the receiving antennas. The radio frequency signal may represent one or more data streams depending on the number of layers. For example, the radio frequency signal may be a combination, or a composite of individual radio frequency signals received through the receiving antennas, and which represent individual data streams respectively. The equalization coefficients derived for each component may be a vector or a matrix depending on the number of layers that provide the radio frequency signal. If more than one layer is involved, the equalization coefficients derived for each component may be a matrix of coefficients whose size is $N_{RX} \times N_L$, where $N_{RX}$ is the number of receiving antennas and $N_L$ is the number of layers. If one layer is involved, the equalization coefficients derived for each component may be a vector of coefficients of size $N_{RX}$.

For example, each reference data component of the reference data components may be associated with a respective time-frequency unit, wherein the time-frequency unit comprises a pair of one time unit and one frequency unit. This may result in a set of time-frequency units associated with the reference data components respectively.

The computation of the initial equalization coefficients for the reference data components may be performed by using alternative advantageous techniques according to the present subject matter. "The computation of the initial equalization coefficients for the reference data components" may mean that the computation of the of the initial equalization coefficients is performed based on (or using) reference data which is present in the reference data components.

In one first computation example, the channel information may be determined for each time-frequency unit of the set of time-frequency units. And for each time-frequency unit of the set of time-frequency units, initial equalization coefficients may be computed using the channel information which was determined for the each time-frequency unit. The initial equalization coefficients may be computed using an equalization algorithm.

The determining of the channel information may comprise deriving the channel information by the means of the apparatus. Alternatively, the determining of the channel information may comprise receiving the channel information e.g., from another apparatus. The channel information of a specific time-frequency unit may comprise an estimated channel response (or channel estimate) for the specific time-frequency unit. In another example, the channel information for the specific time-frequency unit may comprise the channel estimate for the time unit-frequency unit and an interference covariance matrix for the time unit-frequency unit. The channel information of a specific time-frequency unit may be determined using reference data in the reference data component which is associated with the specific time-frequency unit.

This example may compute the initial equalization coefficients based on fine-grained time and frequency resources. This may be advantageous, because computing the channel response with finer frequency and time units may provide more accurate information about the channel's characteristics. This accuracy can lead to improved equalization performance, as the equalizer can better adapt to the channel's behavior and mitigate the effects of channel impairments. Fine-grained channel response estimation may allow for more precise equalization coefficient computation, resulting in enhanced signal recovery.

To illustrate this example, assuming that the number of time units covered by the reference data components is $N_s^{rs}$ time units and the number of frequency units covered by the reference data components is $N_c^{rs}$ frequency units. A i-th time unit may be referred to as $t_i$ where i is an integer having value between 1 and $N_s^{rs}$ and a i-th frequency unit may be referred to as $f_i$ where i has value between 1 and $N_s^{rs}$. The distinct pairs of time units and frequency units that can be obtained from the $N_s^{rs}$ time units and $N_c^{rs}$ frequency units may be defined as follows. Each i-th pair of time unit $t_i$ and frequency unit $f_i$, $(t_i, f_i)$ is distinct from another j-th pair $(t_j, f_j)$, if the time unit $t_i$ is different from time unit $t_j$ and/or the frequency unit $f_i$ is different from frequency unit $f_j$. For example, if the number of frequency units is two, $N_c^{rs}=2$, and the number of time units is two, $N_s^{rs}=2$, the number of distinct pairs may be four: $(t_1, f_1)$, $(t_1, f_2)$, $(t_2, f_1)$ and $(t_2, f_2)$ and the number of channel information may be four, each channel information represents a respective distinct pair of time unit and frequency unit.

In one second computation example, the set of time-frequency units may be organized in a set of time-frequency blocks, wherein the time-frequency block comprises one time block and one frequency block, wherein the time block may comprise one or more adjacent time units of the set of time-frequency units, wherein the frequency block may comprise one or more adjacent frequency units of the set of time-frequency units. The channel information may be determined for each time-frequency block of the set of time-frequency blocks. And for each time-frequency block of the set of time-frequency blocks, initial equalization coefficients may be computed using the channel information which was determined for the each time-frequency block. The initial equalization coefficients may be computed using an equalization algorithm. The determining of the channel information may comprise deriving the channel information by the means of the apparatus. Alternatively, the determining of the channel information may comprise receiving the channel information e.g., from another apparatus. The channel information of a specific time-frequency block may comprise an estimated channel response (or channel estimate) for the specific time-frequency block. In another example, the channel information for the specific time-frequency block may comprise the channel estimate for the time unit-frequency block and an interference covariance matrix for the time unit-frequency block. The channel information of a specific time-frequency block may be determined using reference data in the one or more reference data components which are associated with the specific time-frequency block.

For example, in the radio frequency signal, Demodulation Reference Signal (DM-RS) occasions for certain layers may be in even subcarriers [0,2,4,6,8,10], and for other layers may be in odd subcarriers [1,3,5,7,9,11]. According to the second computation example, the channel estimation of all these subcarriers may be resampled to provide channel estimates for selected subcarrier indices [1,4,7,10].

In one third computation example, the set of time-frequency units may be organized in a set of time-frequency blocks, wherein the time-frequency block comprises one time block and one frequency block, wherein the time block may comprise one or more adjacent time units of the set of time-frequency units, wherein the frequency block may comprise one or more adjacent frequency units of the set of time-frequency units. The set of time-frequency blocks may be defined in accordance with a granularity, referred to as second granularity. The determining of the channel information may comprise receiving initial channel information e.g., from another apparatus, which is determined for each initial time-frequency block of an initial set of time-frequency blocks, wherein the set of initial time-frequency blocks may be defined in accordance with a first granularity. The second granularity is coarser than the first granularity. The received initial channel information may be resampled for obtaining the channel information for each time-frequency block of the set of time-frequency blocks. And for each time-frequency block of the set of time-frequency blocks, initial equalization coefficients may be computed using the channel information which was determined for the each time-frequency block. The initial equalization coefficients may be computed using an equalization algorithm.

In this example, the channel information may be provided per group of frequency units. This may for example enable to use averaged interference covariance matrices and averaged channel matrices over multiple subcarriers. Following the above example of four distinct pairs of time units and frequency units $(t_1, f_1)$, $(t_1, f_2)$, $(t_2, f_1)$ and $(t_2, f_2)$, the group of frequency units may be formed by frequency units $f_1$ and $f_2$ which are adjacent frequency units. The same channel information may be provided for the pairs $(t_1, f_1)$ and $(t_1, f_2)$ and another channel information for the pairs $(t_2, f_1)$ and $(t_2, f_2)$. The initial equalization coefficients may be computed per group of frequency units. This may result in two sets of the equalization coefficients because the initial equalization coefficients may be computed only over distinct channel information to minimize related complexity.

To illustrate the interpolation along the time domain, consider the following example. For example, for a specific frequency unit, that three sets of initial equalization coefficients are calculated for time units t1, t3 and t5 and that the total number of time units is five, t1, t2, t3, t4 and t5. The two sets of initial equalization coefficients at t1 and t3 may be used as a starting point to obtain the equalization coefficients for the time unit t2. The two sets of initial equalization coefficients at t3 and t5 may be used as a starting point to obtain the equalization coefficients for the time unit t4.

According to one example, the radio frequency signal comprises a set of components that comprise reference data. The means are further configured for: receiving channel information comprising channel estimates for the set of components respectively, wherein the selected components is a subset of the set of components, wherein the computation of the initial equalization coefficients is performed using the received channel estimates which are associated with the selected components. That is, the computation of the initial equalization coefficients is performed using the received channel information associated with the selected components. This example may be seamlessly integrated in existing systems where the computation of the channel estimates is already implemented. This example may make use of this implementation to save resources required to (re)compute the channel estimates. In addition, this example may further save resources by using only part of the existing channel estimates. Indeed, the apparatus is designed to receive channel estimates for a whole set of components that comprises reference data. However, the computation of the initial equalization coefficients is specifically performed using the received channel estimates associated with a selected subset of components. This may allow for a more targeted and efficient calculation of the coefficients.

According to one example, the interpolation is performed by selecting at least one of two options: the time domain or the frequency domain. The interpolation is then carried out along the selected option, which can be the time domain and/or the frequency domain. By contrast to a systematic choice of interpolation, this example may provide a control mechanism that can decide on the interpolation. This may enable to introduce a conditional use of interpolation. For example, the selection of either option may depend on the specific requirements and characteristics of the system in which the apparatus is implemented.

According to one example, the means are further configured for performing interpolation along the time domain and the frequency domain by interpolating along the time domain before the interpolation along the frequency domain starts.

By performing interpolation along both the time and frequency domains, the apparatus may be able to achieve a more detailed representation of the interference along time and frequency.

Sequential interpolation may allow for more flexibility in choosing interpolation methods for each domain. The interpolation along time domain or frequency domain may have different characteristics or requirements, and using specific interpolation methods tailored to each domain can lead to more accurate results.

Performing interpolation sequentially along one domain before another domain may enable better quality control and error analysis. By examining the intermediate results at each step, it may become easier to identify and address any interpolation artifacts or inconsistencies. This can be particularly important when the accuracy of the interpolation is critical.

Performing interpolation sequentially along time domain and the frequency domain may be computationally more efficient compared to directly interpolating in higher dimensions. This may especially be true when the data to be interpolated is sparsely sampled or when the interpolation algorithm used is computationally intensive.

In an alternative example, the apparatus may be configured to perform the interpolation along the frequency domain before the interpolation along the time domain. This sequence of operations may be more suitable for certain applications where frequency analysis is of primary importance.

The present subject matter may further enhance the efficiency of the apparatus by optimizing the execution of these processes. According to one example, the means are configured for performing the computation of the initial equalization coefficients and the interpolation concurrently. This configuration may allow for the parallel execution of these processes, thereby enhancing the efficiency of the apparatus. In particular, this example may save processing time. Furthermore, this example may allow for flexibility in the allocation of resources. For example, if the computation of the initial equalization coefficients is more computationally intensive than the interpolation process, the apparatus may allocate more processors or cores to the former task to ensure efficient execution. Conversely, if the interpolation process requires more computational resources, the apparatus may allocate more processors or cores accordingly.

According to one example, the means are configured for performing the computation of the initial equalization coefficients before the interpolation. The computation of these coefficients may occur prior to the interpolation process. This example may enable a sequential execution of the present method. Sequential execution may be simpler to implement and program compared to parallel execution. In sequential execution, tasks are executed one after another in a predetermined order, making it easier to reason about the flow of execution and handle dependencies between tasks. This simplicity may lead to faster development and debugging. The sequential execution may simplify the process of debugging and testing. Since tasks are executed one after another, a step-by-step debugging may be performed making it easier to track the flow of execution and identify the source of errors.

According to one example, the means comprise: a first hardware accelerator that is configured to compute the initial equalization coefficients and a second hardware accelerator that is configured to receive the initial equalization coefficients through a hardware interface between the first and second hardware accelerators and to perform the interpolation.

This example may enable separation in hardware implementation between complex channel estimate matrices and received data processing pipe. The present subject may allow for new division of equalization processing into multiple tasks/jobs and partial pipelining of processing over two received slots. This means that new channel estimates can be processed with the channel estimate pipe while the data processing pipe works on old equalization weights and previous slot data.

The purpose of the second hardware accelerator may be to receive the initial equalization coefficients computed by the first hardware accelerator. This reception of the initial equalization coefficients is made possible through the hardware interface that is positioned between the first and second hardware accelerators. Once the initial equalization coefficients are received by the second hardware accelerator, it is configured to perform the interpolation process. The interpolation may involve generating intermediate values between the initial equalization coefficients to obtain a more refined set of coefficients. This process may allow for a smoother transition between the initial equalization coefficients and the final coefficients.

In one example, the interpolation process performed by the second hardware accelerator may be customized based on specific requirements. For example, the interpolation algorithm may be adjusted to prioritize certain coefficients over others, or to follow a specific pattern. This flexibility may allow for the generation of a wide range of interpolated coefficients, tailored to the needs of the particular application.

Furthermore, alternative examples of the second hardware accelerator may be considered. For instance, instead of using a hardware interface to receive the initial equalization coefficients, the second hardware accelerator may directly access the memory where the first hardware accelerator stores the initial equalization coefficients. This alternative approach may eliminate the need for a separate hardware interface, potentially reducing the complexity and cost of the apparatus.

According to one example, the selected components represent Demodulation Reference Signal (DM-RS) occasions, respectively. The reference data components may include a plurality of DM-RS occasions that are used for channel estimation in wireless communication systems. Each DM-RS occasion may correspond to a specific time and frequency resource within the wireless communication system. For example, in a 5G communication system, the selected reference data components may include DM-RS occasions that are allocated in the time-frequency grid of the system. These DM-RS occasions may be used by the receiver to estimate the channel conditions and perform accurate demodulation of the received signals.

In operation, the first hardware accelerator may compute the initial equalization coefficients based on the received DM-RS occasions. The initial equalization coefficients may represent the initial estimates of the channel conditions for each DM-RS occasion.

According to one example, the time unit is an Orthogonal Frequency Division Multiplexing (OFDM) symbol, and the frequency unit is a subcarrier unit. The subcarrier unit may be an individual subcarrier or a group of two or more adjacent subcarriers.

By utilizing the OFDM symbol as the time unit and the subcarrier as the frequency unit, the apparatus can efficiently and seamlessly transmit and receive data in a wireless communication system. For example, the first hardware accelerator computes the initial equalization coefficients for each subcarrier and OFDM symbol of subcarriers and OFDM symbols carrying DM-RS, which are then transmitted to the second hardware accelerator through the hardware interface. The second hardware accelerator receives these initial equalization coefficients and performs interpolation to estimate the equalization coefficients for the remaining subcarriers in the OFDM symbols.

According to one example, the equalization algorithm may be configured to perform Minimum Mean Square Error (MMSE) equalization, Maximum Likelihood (ML) equalization, Adaptive Equalization, or Decision Feedback Equalization (DFE).

The equalization algorithm performing MMSE equalization may be referred to as interference rejection combining (IRC) algorithm, wherein the equalization coefficients are IRC weights. The channel information used to compute the initial IRC weights may comprise channel matrices and interference covariance matrices for the set of time-frequency blocks.

For example, the apparatus may compute the initial IRC weights per distinct pair of time unit and frequency unit. The computation is performed using a channel estimate (e.g., a channel estimate matrix) for the pair of time unit and frequency unit and an interference covariance matrix for the pair of time unit and frequency unit.

In another example, the apparatus is configured for receiving channel estimates and covariance matrices for the set of components. The selected components are a subset of the set of components. The computation of the initial IRC weights is performed using the received channel estimates and covariance matrices, which are associated with the selected components.

The present subject matter may advantageously be used in the context of a multiple input, multiple output (MIMO) or multi-user MIMO (MU-MIMO) data communication. For that, the apparatus may comprise a number $N_{RX}$ of receiving antennas. The apparatus may receive a total number $N_L$ of layers transmitted by one or more users. In this case, the initial IRC weights for a specific time-frequency block may be provided as a matrix $W_{IRC,d} = (H^H R^{-1} H)^{-1} H^H R^{-1}$, where H is a channel estimate $N_{RX} \times N_L$ matrix and R is an interference covariance $N_{RX} \times N_{RX}$ matrix for the specific time-frequency block. The IRC weights which are derived by interpolation for a specific non-reference data component may be provided as a matrix $W_{IRC}$ of the same size as the initial IRC weigh matrix $W_{IRC,d}$.

Each component of the radio frequency signal may thus be provided as a vector $y \in \mathbb{C}^{N_{RX} \times 1}$, where the corresponding original transmitted data symbols x may be obtained using the derived IRC weight matrix as follows: $x = W_{IRC} y$. In case the frequency unit is a sub-carrier and time unit is a OFDM symbol, y may be the received spatial vector for a specific subcarrier and one OFDM symbol. The data symbols x may be transmitted simultaneously on one subcarrier.

An apparatus comprising: at least one processor; and at least one memory storing instructions that, when executed by the at least one processor, cause the apparatus at least to perform: receiving a radio frequency signal, the radio frequency signal comprising components, wherein each component is associated with a time unit and a frequency unit; selecting components of the radio frequency signal, the selected components comprising reference data; computing, for the selected components, equalization coefficients, referred to as initial equalization coefficients; deriving the equalization coefficients for non-reference data components of the radio frequency signal by interpolating, along at least one of time domain or frequency domain, the initial equalization coefficients.

A non-transitory computer readable medium, the non-transitory computer readable medium comprising program instructions that, when executed by an apparatus, cause the apparatus to perform at least the following: receiving a radio frequency signal, the radio frequency signal comprising components, wherein each component is associated with a time unit and a frequency unit; selecting components of the radio frequency signal, the selected components comprising reference data; computing, for the selected components, equalization coefficients, referred to as initial equalization coefficients; deriving the equalization coefficients for non-reference data components of the radio frequency signal by interpolating, along at least one of time domain or frequency domain, the initial equalization coefficients.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 110 and 112. The devices 110 and 112 may, for example, be user devices. The devices 110 and 112 are configured to be in a wireless connection on one or more communication channels with a node 114. The node 114 is further connected to a core network 120. In one example, the node 114 may be an access node (such as (e/g)NodeB) 114 providing or serving devices in a cell. In one example, the node 114 may be a non-3GPP access node. The physical link from a device to a (e/g)NodeB is called uplink or reverse link and the physical link from the (e/g)NodeB to the device is called downlink or forward link. It should be appreciated that (e/g)NodeBs, or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 20 (CN or next generation core NGC). For example, the (e/g)NodeB may connect to an access and mobility management function (AMF) and user plane function (UPF) in the control plane and user plane, respectively. Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented. 5G enables using multiple input-multiple output (MIMO) antennas, many more base stations or nodes than an existing Long-Term Evolution (LTE) system (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet as illustrated by the component referenced by reference numeral 122, or utilize services provided by them. The communication network may also be able to support the usage of cloud services, for example at least part of core network operations may be carried out as a cloud service (this is depicted in FIG. 1 by "cloud" 124). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 114) and non-real time functions being carried out in a centralized manner (in a centralized unit, CU 118).

It should also be understood that the distribution of labor between core network operations and base station operations may differ from that of the LTE or even be non-existent. Some other technology advancements probably to be used are Big Data and all-IP, which may change the way networks are being constructed and managed. 5G is being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 116 in the mega-constellation may cover several satellite-enabled network entities that create on-ground cells. The on-ground cells may be created via an on-ground relay node 114 or by a gNB located on-ground or in a satellite.

It is understandable for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. One of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
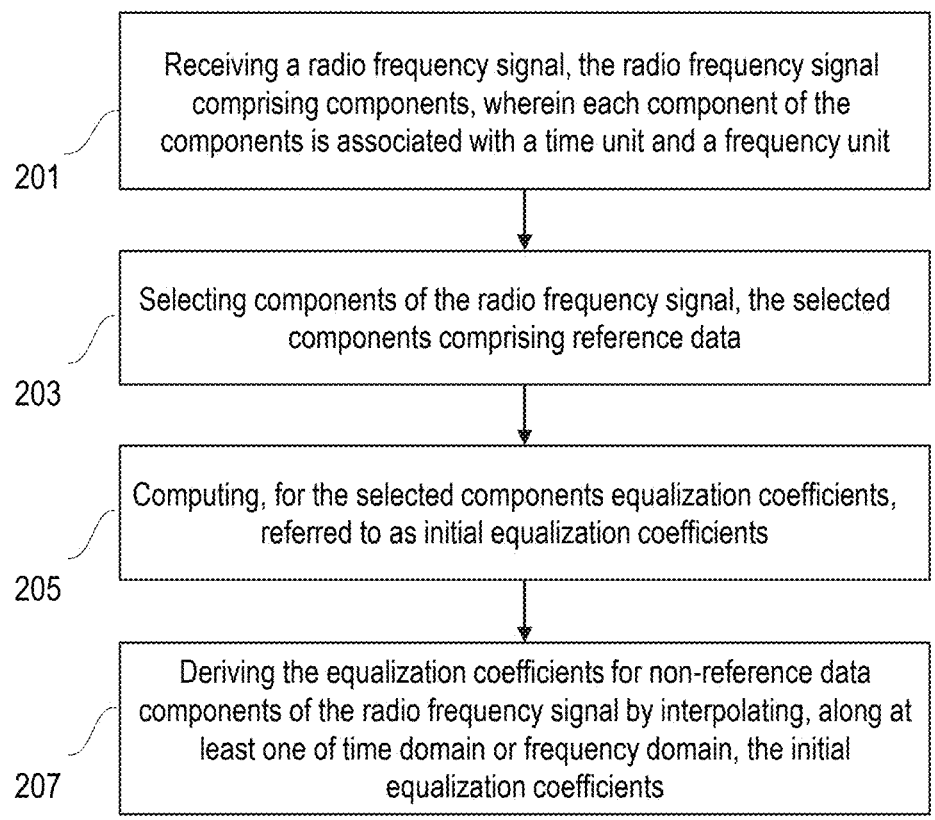
FIG. 2 is a flowchart of a method determining equalization coefficients according to an example of the present subject matter.

FIG. 2 is a flowchart of a method according to an example of the present subject matter. For the purpose of explanation, the method described in FIG. 2 may be implemented in the system illustrated in FIG. 2, but is not limited to this implementation. The method may, for example, be performed by the node 114.

A radio frequency signal may be received in step 201. The radio frequency signal comprises components, wherein each component of the components is associated with a time unit and a frequency unit.

Components of the radio frequency signal may be selected in step 203, wherein the selected components comprise reference data.

Equalization coefficients may be computed in step 205 for the selected components. These computed equalization coefficients may be referred to as initial equalization coefficients.

The equalization coefficients may be derived in step 207 for non-reference data components of the radio frequency signal by interpolating the initial equalization coefficients along at least one of time domain or frequency domain.

The method of FIG. 2 may, for example, be performed by an equalizer. In case the equalization is an MMSE equalization, the equalizer may be referred to as IRC equalizer.

The present subject matter may advantageously use alternative techniques for selecting the components in step 203. In one example, the selected components may be a subset of all components of the received radio frequency signal that comprise reference data. This may further reduce the complexity of the computation compared to using all reference components while still providing reliable estimation of the equalization coefficients. In another example, the selected components may be all components of the received radio frequency signal that comprise reference data. This may improve accuracy of the equalization coefficients while still reducing the complexity of the computation compared to existing techniques.

The initial equalization coefficients may be computed using one of the first computation example, the second computation example or the third computation example.

Figure 3:
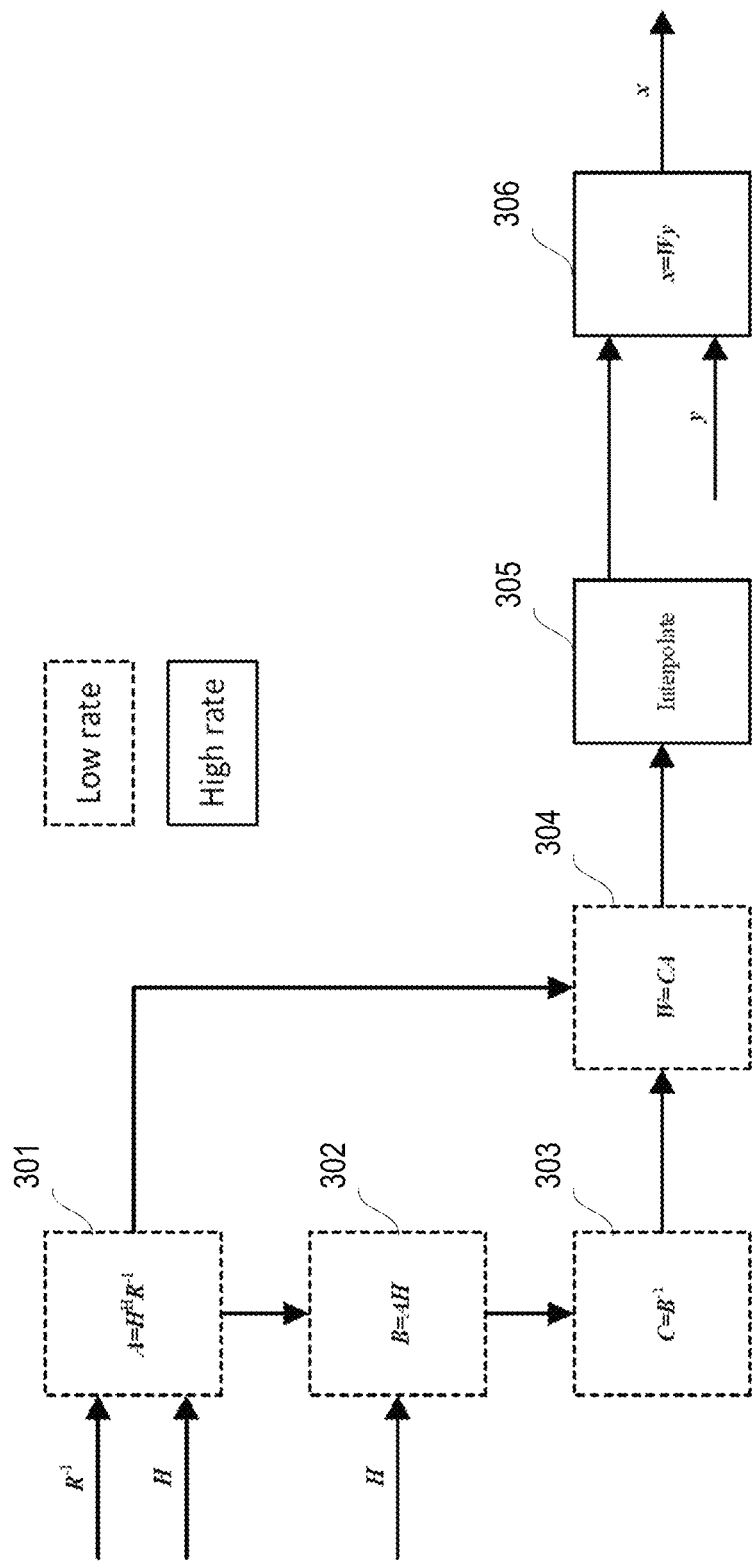
FIG. 3 is a diagram of an interference rejection combining (IRC) equalizer in accordance with an example of the present subject matter.

FIG. 3 is a block diagram illustrating components of an IRC equalizer according to an example of the present subject matter. The IRC equalizer may be part of a receiver such as the node 114 of FIG. 1.

In this example, a transmitter such as the UE 110 may transmit the data x to a receiver such as the node 114. The receiver may receive data y, where $y \in \mathbb{C}^{N_{RX} \times 1}$ represents the received data vector. The present subject matter may enable to reconstruct the originally transmitted data x using the following equation: $x=(H^H R^{-1} H)^{-1} H^H R^{-1} y$, where $R^{-1} \in \mathbb{C}^{N_{RX} \times N_{RX}}$ represents the interference covariance matrix, and $H \in \mathbb{C}^{N_{RX} \times N_L}$ represents the channel estimate. The interference covariance matrix $R^{-1}$ and the channel estimate H may be provided per subcarrier per OFDM symbol. Alternatively, the interference covariance matrix $R^{-1}$ and the channel estimate H may be provided per group of subcarriers in each OFDM symbol.

The present subject matter may enable to solve that equation by: calculating an initial IRC weight matrix $W_{IRC,d}$, where $W_{IRC,d}=(H^H R^{-1} H)^{-1} H^H R^{-1}$ with reduced resolution in time and frequency, and for each data bearing OFDM symbol and subcarrier, linearly interpolating $W_{IRC,d}$ in time and frequency to obtain $W_{IRC}$, and then computing $x=W_{IRC} y$ with full time and frequency resolution.

For that, the present subject matter may process separately the low-rate data and high-rate data of the received radio frequency signal comprising data x. The low-rate data comprises channel information in accordance with a granularity of the time-frequency units associated with the reference data. The high-rate data comprises the non-reference data components of the radio frequency signal. The reference data components may for example represent pilot signals while the non-reference data components may represent data signals. The low-rate data may for example occupy a number $N_s^{rs}$ of OFDM symbols, and occupy in each OFDM symbol a number $N_c^{rs}$ of subcarrier units. The subcarrier unit may be one individual subcarrier or a group of two or more adjacent subcarriers. For example, the number $N_c^{rs}$ of subcarrier units may refer to the number of individual subcarriers and/or the number of groups of subcarriers e.g., a number $N_c^{rs}=3$ of subcarrier units may represent three individual subcarriers, or one individual subcarrier and two groups of subcarriers, or three groups of subcarriers or one group of subcarriers and two individual subcarriers. As illustrated in FIG. 3, the components 301 through 304 may be used for processing the low-rate data in order to compute the initial IRC weight matrix $W_{IRC,d}$ for each pair of OFDM symbol and subcarrier unit in the low-rate data. That is, a number $N_s^{rs} \times N_c^{rs}$ of matrices $W_{IRC,d}$ may be computed by the components 301 through 304. For that, the component 301 may receive the $N_s^{rs} \times N_c^{rs}$ channel matrices and the $N_s^{rs} \times N_c^{rs}$ interference covariance matrices which are computed for the OFDM symbols and subcarrier units of the low rate data. The component 301 may compute the matrix A as follows $A=H^H R^{-1}$. This may result in a number $N_s^{rs} \times N_c^{rs}$ of computed matrices A. The received interference covariance matrices and channel matrices, or related information, may be estimated outside the IRC equalizer and are given as an input.

The component 302 may receive the $N_s^{rs} \times N_c^{rs}$ matrices A from the component 301 and may further receive the $N_s^{rs} \times N_c^{rs}$ channel matrices and compute the matrix B as follows $B=AH$. This may result in a number $N_s^{rs} \times N_c^{rs}$ of computed matrices B. The component 303 may receive the $N_s^{rs} \times N_c^{rs}$ matrices B from the component 302 and compute the matrix C as follows $C=B^{-1}$. This may result in a number $N_s^{rs} \times N_c^{rs}$ of computed matrices C. The component 304 may receive the $N_s^{rs} \times N_c^{rs}$ matrices A from the component 301 and the $N_s^{rs} \times N_c^{rs}$ matrices C from the component 303 and compute the initial IRC weight matrix as follows: $W_{IRC,d}=CA$. This may result in a number $N_s^{rs} \times N_c^{rs}$ of computed matrices $W_{IRC,d}$.

To illustrate this example further, assume that initial IRC weights are calculated only for 4 subcarriers per physical resource block (PRB) and only 2 DM-RS symbols. In a typical scenario, there may be 12 subcarriers per PRB, 12 data symbols and 2 DM-RS symbols per slot (e.g., the slot may have 14 symbols), the low-rate part operates on $4/12 * 2/12 = 1/18$ fraction of samples. This may enable a significant complexity reduction.

Then, at high sampling rate there may be only linear interpolation of weight matrices and matrix product between interpolated IRC weight matrix and received data vector. This may be performed by component 305. The component 305 may receive the $N_s^{rs} \times N_c^{rs}$ initial IRC weight matrices $W_{IRC,d}$ from the component 304 and perform interpolation in order to obtain the IRC weight matrix $W_{IRC}$ for each OFDM symbol and each subcarrier carrying data in the received radio frequency signal. This may result in a number of IRC weight matrices equal to the number of pairs of OFDM symbols and subcarriers that carry data in the received radio frequency signal. These IRC weight matrices are used by the component 306 to estimate the transmitted data as follows: $x=W_{IRC} y$.

Figure 4:
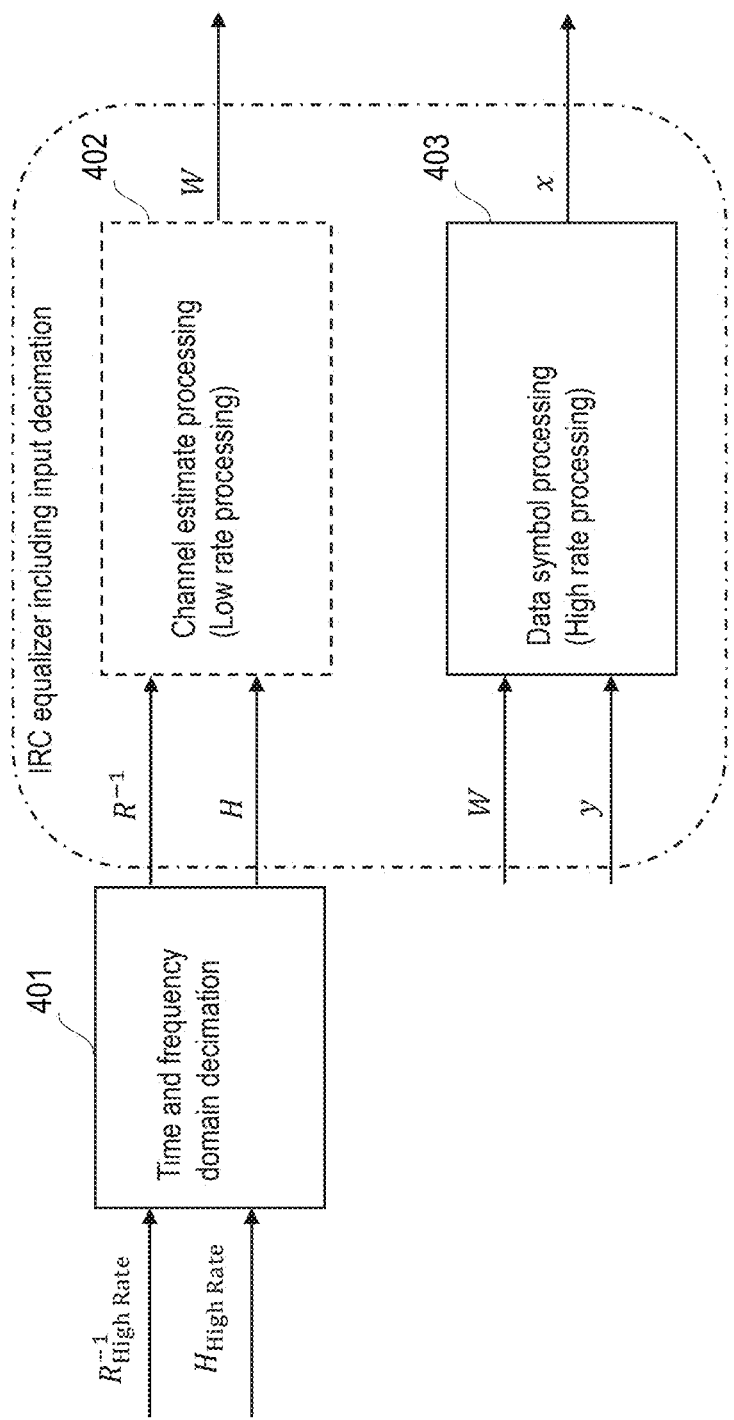
FIG. 4 is a diagram of an IRC equalizer in accordance with an example of the present subject matter.

FIG. 4 is a block diagram illustrating components of an IRC equalizer according to an example of the present subject matter. The IRC equalizer may be part of a receiver such as the node 114 of FIG. 1.

As with FIG. 3, in this example, a transmitter such as the UE 110 may transmit the data x to a receiver such as the node 114. The receiver may receive data y, where $y \in \mathbb{C}^{N_{RX} \times 1}$ represents the received data vector with $N_{RX}$ antennas. The present subject matter may enable to reconstruct the originally transmitted data x using the following equation: $x=(H^H R^{-1} H)^{-1} H^H R^{-1} y$, where $R^{-1} \in \mathbb{C}^{N_{RX} \times N_{RX}}$ represents the interference covariance matrix, and $H \in \mathbb{C}^{N_{RX} \times N_L}$ represents the channel estimate e.g., per subcarrier unit per OFDM symbol. The present subject matter may enable to solve that equation by calculating an initial IRC weight matrix $W_{IRC,d}$, where $W_{IRC,d}=(H^H R^{-1} H)^{-1} H^H R^{-1}$ with reduced resolution in time and frequency, and for each data bearing OFDM symbol and subcarrier unit, linearly interpolating $W_{IRC,d}$ in time and frequency to obtain $W_{IRC}$, and then computing $x=W_{IRC}y$ with full time and frequency resolution.

The present subject matter may process separately the low-rate data and high-rate data of the received radio frequency signal comprising data x. The low-rate data comprises channel information in accordance with a granularity of the time-frequency units associated with the reference data. The high-rate data comprises the non-reference data components of the radio frequency signal. The selected reference data components may for example represent pilot signals while the non-reference data components may represent data signals. The low-rate data may for example occupy a number $N_s^{rs}$ of OFDM symbols, and occupy in each OFDM symbol a number $N_c^{rs}$ of subcarrier units.

For that, and as shown in FIG. 4, the channel estimate processing and data symbol processing are divided to separate tasks and separate submodules in hardware (HW) implementation. This may allow to separately scale the complexity, size, latency, and power consumptions of these parts. Scaling the size of this block may allow to reduce the first sample-in-first-sample-out latency. In particular, the IRC equalizer comprises a channel estimate processing unit 402 and a data symbol processing unit 403. The channel estimate processing unit 402 may comprise, for example, the components 301 through 304 that enable to compute the initial IRC weight matrices for low rate data. For that, the channel estimate processing unit 402 may receive the $N_s^{rs} \times N_c^{rs}$ channel matrices and the $N_s^{rs} \times N_c^{rs}$ interference covariance matrices which are computed for the OFDM symbols and subcarrier units of the low rate data. Using that input, the channel estimate processing unit 402 may compute the initial IRC weight matrices, namely $N_s^{rs} \times N_c^{rs}$ matrices $W_{IRC,d}$.

The data symbol processing unit 403 may, for example, comprise the components 305 and 306 of FIG. 3. The data symbol processing unit 403 may receive the $N_s^{rs} \times N_c^{rs}$ initial IRC weight matrices $W_{IRC,d}$ from the channel estimate processing unit 402 and perform interpolation in order to obtain the IRC weight matrix $W_{IRC}$ for each OFDM symbol and each subcarrier unit carrying data in the received radio frequency signal and use the IRC weight matrices $W_{IRC}$ to estimate the transmitted data.

In one optional implementation, the $N_s^{rs} \times N_c^{rs}$ channel matrices and the $N_s^{rs} \times N_c^{rs}$ interference covariance matrices may be obtained by resampling by a decimation unit 401 a larger number of channel matrices and interference covariance matrices that have been determined for a higher number of OFDM symbols and higher number of subcarrier units. The $N_s^{rs} \times N_c^{rs}$ channel matrices and the $N_s^{rs} \times N_c^{rs}$ interference covariance matrices are then provided by the decimation unit 401 to the channel estimate processing unit 402.

The channel estimate processing unit 402 may generate at least two initial IRC weight matrices in time domain and frequency domain (so total of 4 weight matrices) before the data processing pipe can start at the data symbol processing unit 403. Alternatively, the channel estimate processing pipe may process all low rate data before launching data processing pipe, or some intermediate amount of data.

When considering the data symbol processing unit 403, it may be implemented by designing one module with a specific processing capacity, and then the total latency can be reduced by introducing multiple modules. The data symbol processing part may basically contain only two dimensional linear interpolation of IRC weight matrices per PRB and multiplication of received data with interpolated weight matrix. Thus, it may be easy to build high throughput submodule for this. This design may reduce latency compared to an existing equalizer, while maintaining most of the complexity savings.

Figure 5:
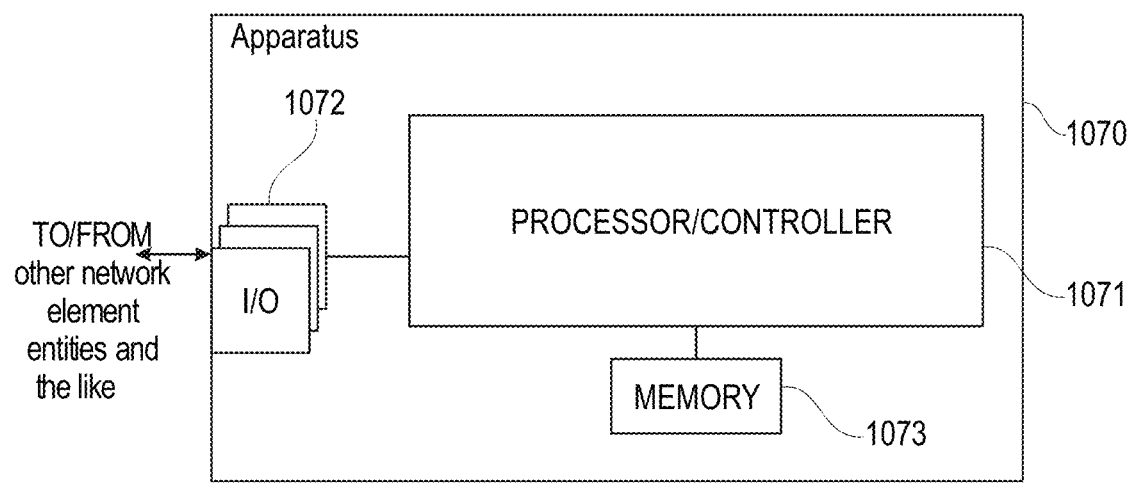
FIG. 5 is a block diagram showing an example of an apparatus according to an example of the present subject matter.

In FIG. 5, a block circuit diagram illustrating a configuration of an apparatus 1070 is shown, which is configured to implement at least part of the present subject matter. FIG. 5 may provide an example implementation of the means of the apparatus according to the present subject matter. It is to be noted that the apparatus 1070 shown in FIG. 5 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform the method as described in connection with FIG. 2.

For example, the processor 1071 is configured for: receiving a radio frequency signal, the radio frequency signal comprising components, wherein each component is associated with a time unit and a frequency unit; selecting components of the radio frequency signal, the selected components comprising reference data; computing, for the selected components, equalization coefficients, referred to as initial equalization coefficients; deriving the equalization coefficients for non-reference data components of the radio frequency signal by interpolating, along at least one of time domain or frequency domain, the initial equalization coefficients.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

The invention claimed is:

1. An apparatus for a wireless communication system, the apparatus comprising at least one processor; and at least one memory storing instructions that, when executed by the at least one processor, cause the apparatus at least to:
   receive a radio frequency signal, the radio frequency signal comprising components, wherein each component of the components is associated with a time unit and a frequency unit;
   select components of the radio frequency signal, the selected components comprising reference data;
   receive channel information in accordance with a first granularity of the time units and frequency units associated with the selected components,
   resample the channel information for obtaining channel information in accordance with a second granularity that is coarser than the first granularity;
   compute, for the selected components, equalization coefficients, referred to as initial equalization coefficients, wherein the computation of the initial equalization coefficients is performed using the resampled channel information; and
   derive the equalization coefficients for non-reference data components of the radio frequency signal by interpolating the initial equalization coefficients along at least one of time domain or frequency domain.

2. The apparatus of claim 1, wherein the initial equalization coefficients are computed per distinct pair of time unit and frequency unit of the selected components using channel information for the pair of time unit and frequency unit, wherein the channel information comprises a channel estimate.

3. The apparatus of claim 1, wherein the instructions, when executed by the at least one processor, further cause the apparatus to perform interpolation comprising at least:
   selecting at least one domain of: time domain or frequency domain; and
   performing the interpolation along the selected domain.

4. The apparatus of claim 1, wherein the instructions, when executed by the at least one processor, further cause the apparatus to perform interpolation along the time domain and the frequency domain by interpolating along the time domain before the interpolation along the frequency domain.

5. The apparatus of claim 1, wherein the instructions, when executed by the at least one processor, further cause the apparatus to perform the computation of the initial equalization coefficients and the interpolation concurrently.

6. The apparatus of claim 1, wherein the instructions, when executed by the at least one processor, further cause the apparatus to perform the computation of the initial equalization coefficients before the interpolation starts.

7. The apparatus of claim 1, the apparatus comprising: a first hardware accelerator that is configured to compute the initial equalization coefficients and a second hardware accelerator that is configured to:
   receive the initial equalization coefficients through a hardware interface between the first and second hardware accelerators, and
   perform the interpolation.

8. The apparatus of claim 1, the selected components represent Demodulation Reference Signal (DM-RS) occasions respectively.

9. The apparatus of claim 1, wherein the instructions, when executed by the at least one processor, further cause the apparatus to suppress interference from the received non-reference data components by weighting the data in the non-reference data components using the derived equalization coefficients.

10. The apparatus of claim 1, the apparatus comprising multiple receiving antennas, wherein each component of the radio frequency signal is a vector of symbols received by the receiving antennas respectively.

11. The apparatus of claim 1, the apparatus comprising multiple receiving antennas, wherein the equalization coefficients are interference rejection combining (IRC) weights, wherein the initial IRC weights for a specific time-frequency block associated with the selected components are provided as a matrix $W_{IRC,d}(\text{Original}) = (H^H R^{-1} H)^{-1} H^H R^{-1}$, where H is a channel estimate $N_{RX} \times N_L$ matrix and R is an interference covariance $N_{RX} \times N_{RX}$ matrix for the specific time-frequency block, where $N_{RX}$ is the number of receiving antennas and $N_L$ is the number of transmitted layers.

12. A method comprising:
receiving a radio frequency signal, the radio frequency signal comprising components, wherein each component is associated with a time unit and a frequency unit;
selecting components of the radio frequency signal, the selected components comprising reference data;
receiving channel information in accordance with a first granularity of the time units and frequency units associated with the selected components,
resampling the channel information for obtaining channel information in accordance with a second granularity that is coarser than the first granularity;
computing, for the selected components, equalization coefficients, referred to as initial equalization coefficients, wherein the computation of the initial equalization coefficients is performed using the resampled channel information; and
deriving the equalization coefficients for non-reference data components of the radio frequency signal by interpolating, along at least one of time domain or frequency domain, the initial equalization coefficients.

13. The method of claim 12, wherein the radio frequency signal comprises a set of components that comprise reference data, the method further comprising:
receiving channel estimates for the set of components, wherein the selected components is a subset of the set of components, and wherein the computation of the initial equalization coefficients is performed using the received channel estimates which are associated with the selected components.

14. The method of claim 12, the interpolation comprising:
selecting at least one domain of: time domain or frequency domain; and
performing the interpolation along the selected domain.

15. The method of claim 12, wherein the interpolation is performed along the time domain and the frequency domain by interpolating along the time domain before the interpolation along the frequency domain starts.

16. The method of claim 12, wherein the computation of the initial equalization coefficients and the interpolation are performed concurrently.

17. The method of claim 12, wherein the computation of the initial equalization coefficients is performed before the interpolation starts.

18. The method of claim 12, further comprising suppressing interference from the received non-reference data components by weighting the data in the non-reference data components using the derived equalization coefficients.

* * * * *